March 2, 1926.  1,575,509
J. SCHWAB, JR
REENFORCED TUBE LINING
Filed August 17, 1925
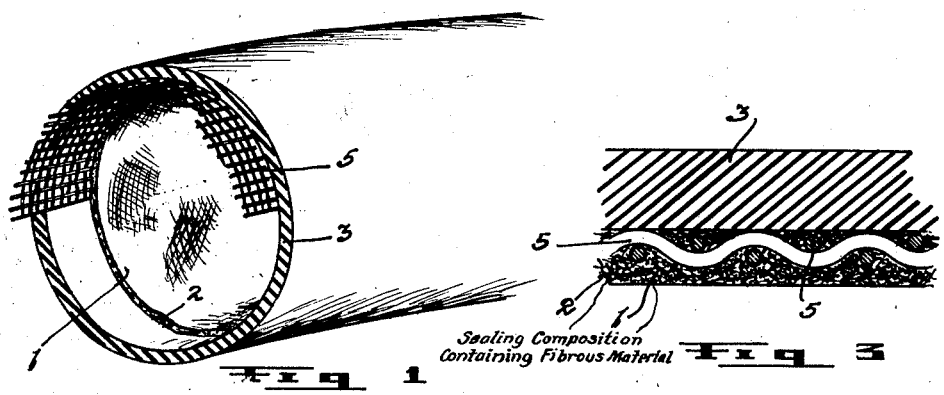
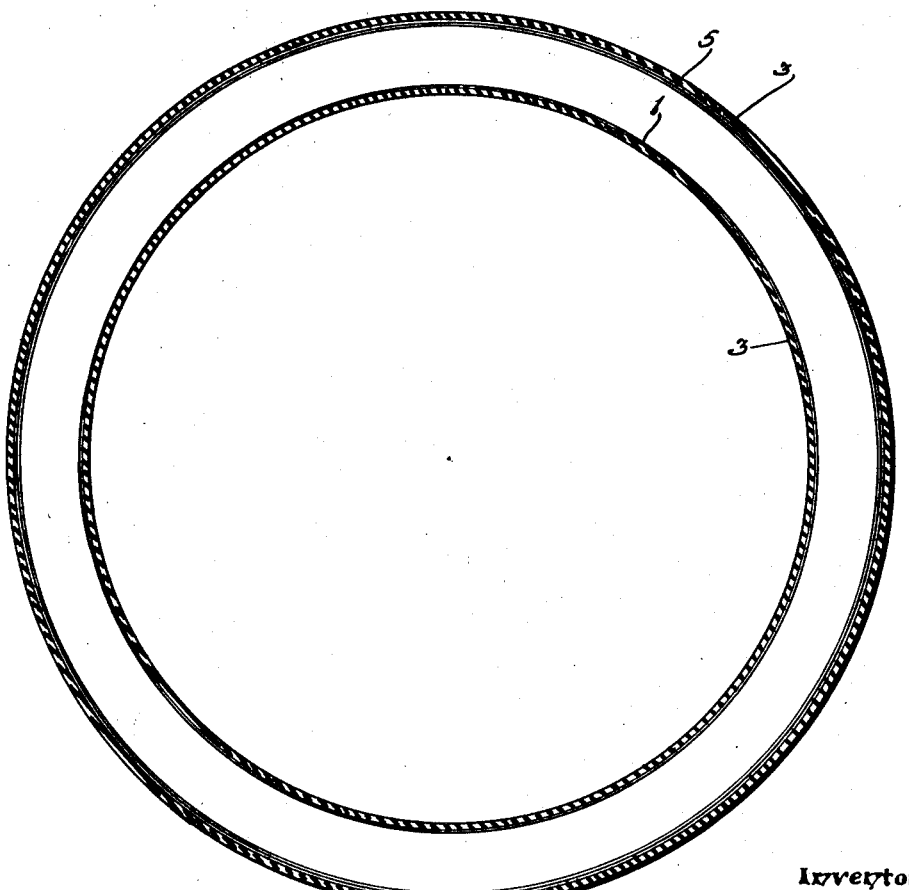
Inventor
J. Schwab Jr.

Patented Mar. 2, 1926.

1,575,509

UNITED STATES PATENT OFFICE.

JOHN SCHWAB, JR., OF WINNIPEG, MANITOBA, CANADA.

REENFORCED TUBE LINING.

Application filed August 17, 1925. Serial No. 50,700.

*To all whom it may concern:*

Be it known that I, JOHN SCHWAB, Junior, a subject of the King of Great Britain, and resident of the city of Winnipeg, in the Province of Manitoba, Canada, have invented certain new and useful Improvements in Reenforced Tube Linings, of which the following is the specification.

The invention relates particularly to linings for inner automobile and such like tubes and an object of the invention is to provide a reenforced sealing composition within the tube which will fill a puncture or cut immediately the same occurs and which will remain sufficiently plastic or mobile at all times and under all conditions to flow into the puncture or cut and seal it under the pressure of the air within the tube.

A further object is to provide a tube lining wherein the reenforcing material serves to bond the composition and gives a body to the composition which acts effectively to plug a hole or puncture.

A further object is to provide a tube lining which has not only a fibrous bonding material mixed therein but has also incorporated therein, within the tube, a further reenforcing woven fabric or cord which acts to retain the composition should a hole be made in the tire and which also causes the lining to shift bodily if such should occur under heavy duty conditions.

With the above more important objects in view, the invention consists essentially in the arrangement and construction of parts hereinafter more particularly described, reference being had to the accompanying drawing, in which:

Fig. 1 is a perspective view showing a portion of a tube equipped with my lining.

Fig. 2 is a vertical longitudinal sectional view through the tube.

Fig. 3 is an enlarged detailed vertical sectional view through a fragmentary portion of the tube.

In the drawing like characters of reference indicate corresponding parts in the several figures.

In providing a rubber composition for lining a tube in accordance with my invention, I use a quantity of rubber, melted by heat, such as melted vulcanized rubber or melted raw rubber, a quantity of vulcanizing cement, a quantity of sulphur and a reenforcing material.

The reenforcing material for ordinary duty tubes can be short lengths of hemp, wool, hair or other such material which will bond and reenforce the composition, the said material being mixed into the former materials when the same are hot. I have found that by utilizing nine parts of melted rubber, nine parts of vulcanizing cement and two parts of sulphur and adding to this mixture when hot, a sufficient quantity of the reenforcing material, I obtain a desirable composition.

In preparing the composition, the first three ingredients are thoroughly mixed together and the mixture is heated to a temperature above boiling point and preferably in a steam heated boiler, for say half an hour. While this mixture is still hot, I add the bonding or reenforcing material and thereafter thoroughly mix the composition so that the latter material is well incorporated throughout the entire mass.

This material, if placed in the ordinary tube to coat the inner wall thereof, will effectively close a hole or puncture made in the tube and I have found that the fibrous reenforcing material acts to prevent the composition from shifting in the tube when the same is in use and has sufficient body to plug and seal the hole or puncture when the same is made.

Here I might explain that if the reenforcing material were not incorporated in the mass and the hole or puncture made was somewhat larger than the customary nail puncture, the pressure of the air in the tube might blow the composition out through the hole. The reenforcing material serves to prevent this as the hole is plugged by it and sealed by the rubber composition.

It is desirable to have the reenforcing material clean and to this end, I wash it in gasoline or coal oil prior to incorporating it in the mixture.

For heavy duty tubes, it is desirable to place a woven cord or fabric strip in the tube at the tread side, this material becoming incorporated in the reenforcing composition previously described when the latter is placed in the tube. The rubber composition 1 having the fibrous reenforcing material 2 therein is placed in the tube 3 when the said composition is warm. This can be done prior to the ends of the tube having been spliced together or if the tube is a finished tube, one can remove the valve and force the mixture into the tube through the valve opening or if desired, a hole can be cut in the tube and the hole subsequently vulcanized after the mixture has been placed therein.

For heavy duty tubes, the strip of woven cord or fabric 5 is placed in the tube prior to the ends of the same being spliced and after the strip of fabric has been passed endwise through the tube at the tread side, the protruding ends of the fabric are fastened together so that I have a continuous strip of reenforcing fabric covering the inner wall of the tube at the tread side. This reenforcing cord or fabric having been placed in the tube, I then put in the self healing, reenforced rubber composition and the fabric will become incorporated in this composition at the tread side of the tube.

Obviously this fabric will materially strengthen the lining for heavy duty tubes and the pressure of the air in the inflated tube will tend to force the rubber composition through the fabric thereby incorporating the fabric in the composition. This fabric also acts to retard the rubber composition from blowing out through any hole or puncture which might occur and thereby materially aids the composition in sealing the hole or puncture. I have also found that in heavy duty tubes, there is a greater tendency for the sealing composition to creep in the tube under road conditions and the continuous reenforcing fabric or cord strip which I incorporate in the mixture tends not only to keep the mixture evenly distributed but also insures that if the mixture or composition should shift, it will all shift at one time within the tube.

I wish it to be understood that for lighter duty tubes, it does not seem necessary to utilize the fabric or cord strip as the composition having the fibrous reenforcing therein acts very effectively, remaining in place evenly distributed over the inner wall of the tube and acting to seal the hole or puncture when the same occurs and always remaining plastic. With heavy duty tubes, however, where the inflating air pressure is considerably greater and the load and road conditions are much more severe, it will be found advantageous to incorporate the continuous reenforcing fabric or cord strip in the reenforced mixture and at the tread side of the tube as it materially helps the composition to withstand the severe conditions imposed.

What I claim as my invention is:—

1. A pneumatic tube having a lining therein formed from a plastic sealing composition having a fibrous reenforcing material mixed therein and an open meshed reenforcing strip incorporated in the composition.

2. A pneumatic tube having a lining therein formed from a plastic sealing composition having a fibrous reenforcing material mixed therein and a continuous, open meshed, reenforcing strip incorporated in the composition at the tread side of the tube.

3. A pneumatic tube having a lining therein formed from a plastic rubber sealing composition having a fibrous reenforcing material mixed therein and a continuous strip of open meshed, fibrous, reenforcing material incorporated in the composition and next the tread side of the tube.

4. A pneumatic tube having a lining therein formed from a plastic rubber sealing composition coating the entire inner wall of the tube and having a fibrous reenforcing material mixed therein and a continuous woven fabric strip incorporated in the composition and next the tread side of the tube.

Signed at Winnipeg this 27th day of July 1925.

JOHN SCHWAB, Junior.